Sept. 15, 1964     R. D. BUSCH     3,148,437
METHOD AND APPARATUS FOR ASSEMBLING ROLLING BEARINGS
Filed April 30, 1963     3 Sheets-Sheet 1
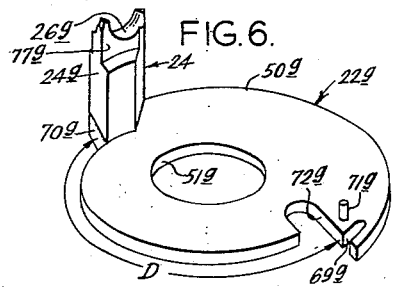
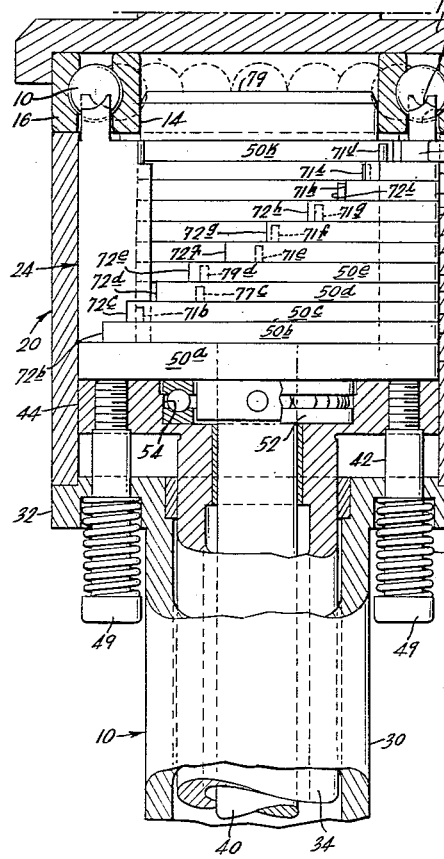
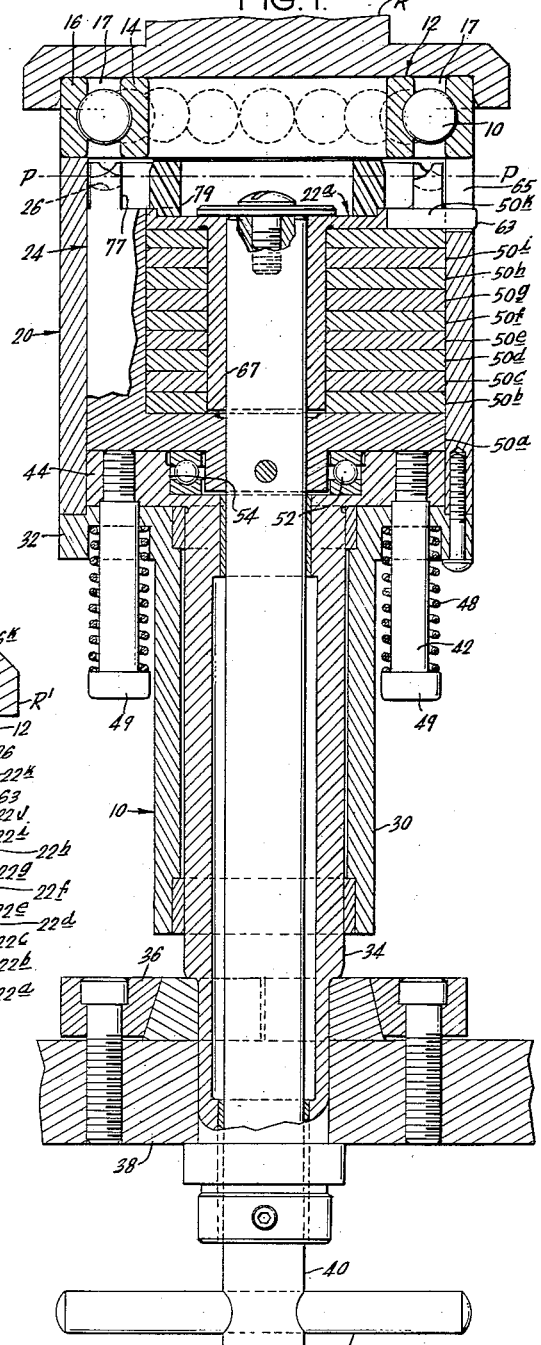
INVENTOR:
RICHARD D. BUSCH
BY Howson & Howson
ATTYS:

Sept. 15, 1964  R. D. BUSCH  3,148,437
METHOD AND APPARATUS FOR ASSEMBLING ROLLING BEARINGS
Filed April 30, 1963  3 Sheets-Sheet 2

INVENTOR:
RICHARD D. BUSCH

BY *Howson & Howson*
ATTYS:

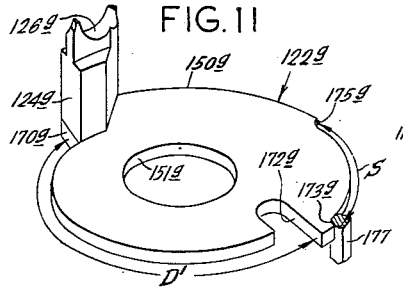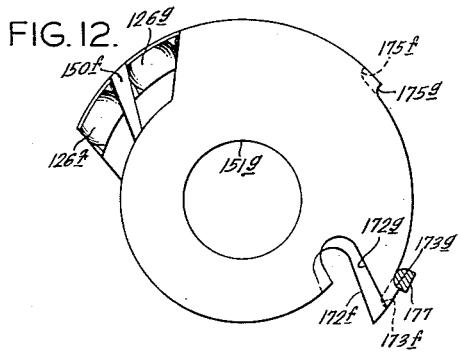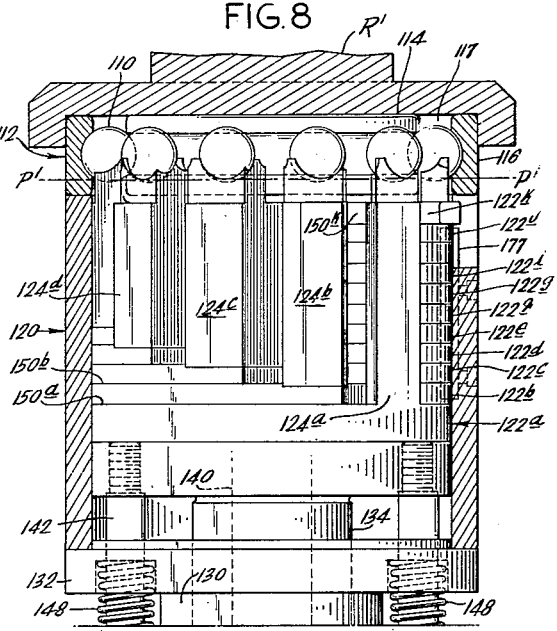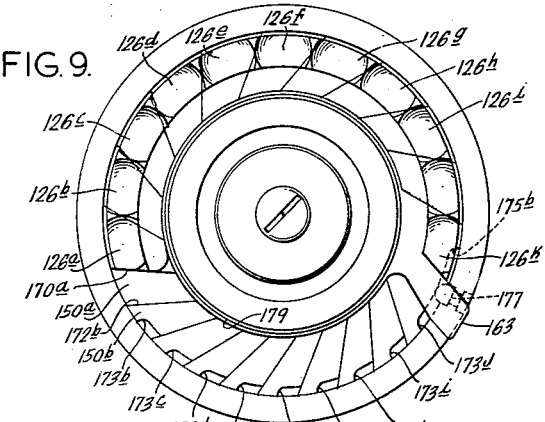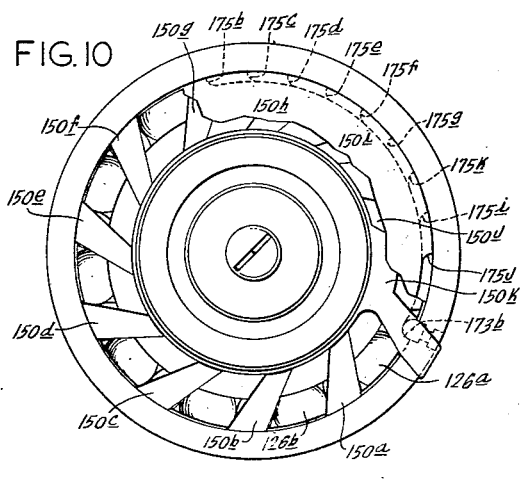

United States Patent Office 3,148,437
Patented Sept. 15, 1964

3,148,437
METHOD AND APPARATUS FOR ASSEMBLING
ROLLING BEARINGS
Richard Detlev Busch, Towson, Md., assignor to SKF
Industries, Inc., Philadelphia, Pa., a corporation of
Delaware
Filed Apr. 30, 1963, Ser. No. 276,880
20 Claims. (Cl. 29—148.4)

The present invention relates to method and apparatus for assembling rolling bearings. More particularly the present invention is directed to a new and improved method and apparatus for orienting or spacing the rolling elements of a rolling bearing to facilitate assembly of a cage.

In assembling, for example a ball bearing assembly, a plurality of spherical rolling elements is inserted in the annular space between the inner and outer race rings. The rolling elements are then oriented in the annular space to provide a predetermined uniform gap between the rolling elements to facilitate assembly of a cage to maintain the rolling elements in spaced apart relation.

Prior to the present invention, typical apparatus for orienting or spacing the rolling elements to receive the cage included an inclined support member on which the bearing rested so that the rolling elements gathered or accumulated in contacting relation in a predetermined arcuate segment of the annular space and a movable carrier head having a plurality of circumferentially spaced fingers having wedge-shaped tips projecting from the head in a circular array, the fingers decreasing in length progressively to either side of the longest finger of the group. The longest finger is disposed to engage centrally of the group of rolling elements upon actuation of the carrier to move the array of fingers into the annular space between the race rings. Thereafter the rearward fingers progressively enter the space between the race rings to orient the rolling elements. By this arrangement, the force exerted on the rolling elements by the fingers has a circumferential force component tending to move the rolling elements circumferentially in the annular space and also an axial component tending to displace the rolling elements axially. This axial component tends to dislocate the rolling elements and inner race ring in relation to the outer race ring thus causing increasing resistance to the spacing motion which might tend to damage the rolling elements and/or the raceways of the race rings. Moreover during spacing operation, groups of the rolling elements are moved circumferentially in the annular space presenting the possibility of the loosely mounted contacting rolling elements becoming jammed thereby resulting in damage to the rolling elements. Thus it has been found that in this prior method, the circumferential forces transferred through the adjacent rolling elements and the undesirable axial force component induced by the fingers result in damage to the bearing during assembly which is difficult to eliminate and which contributes to premature failure of the rolling bearing assembly. These conditions also impair the quiet-running characteristics of the bearing assembly.

With this in mind, an object of the present invention is to provide a method and apparatus for spacing the rolling elements of a bearing assembly in a manner precluding damage to the parts of the assembly. In accordance with the present invention, each rolling element is individually engaged and moved to a definite predetermined location without the transfer of forces through any two adjacent rolling elements and without the creation of an axial force tending to cock the race rings relative to one another. To this end the apparatus of the present invention includes a plurality of rolling element spacing members corresponding in number to at least the number of rolling elements, each member having a rolling element engaging portion or seat. The rolling element engaging portions are disposed in a predetermined common plane. The rolling element spacing members are actuatable between a closed or stacked position and an open position wherein the rolling element engaging portions are disposed in a circular array in predetermined equispaced apart relation. Means is provided to limit movement of the rolling element spacing members relative to one another to insure uniform spacing of all of the members in the open position. By this arrangement with the spacing members in the closed position, a rolling bearing assembly is positioned relative to the rolling element engaging portions or seats with each of the rolling elements confronting and nested in one of the cup-like seats. The rolling element spacing members are then actuated to the open position whereby the rolling elements are individually moved circumferentially in the annular space to the desired oriented spaced apart relation to receive a cage or separator. It is noted that by moving the rolling elements individually, damage due to jamming is obviated and also that there is no tendency to cock the race rings during the spacing operation, thus precluding possible damage resulting from cocking characteristic of the prior method.

With the foregoing in mind, an object of the present invention is to provide a method and apparatus for spacing the rolling elements of a rolling bearing assembly to facilitate application of a cage wherein the forces acting on the rolling elements to space the same are minimal thereby minimizing the risk of damage to rolling bearing assembly.

Another object of the present invention is to provide a method for spacing the rolling elements of a bearing assembly and apparatus for carrying out the method which is of comparatively simplified construction and is easy and economical to manufacture.

These and other objects of the present invention and the various features and details of the operation and construction thereof are hereinafter more fully set forth with reference to the accompanying drawings, wherein:

FIG. 1 is a transverse sectional view of apparatus in accordance with the present invention with the rolling element spacing members in a retracted, stacked position;

FIG. 2 is an enlarged fragmentary sectional view of the apparatus of FIG. 1, showing the rolling element spacing members in an extended, stacked position;

FIG. 6 is a perspective view showing the details of construction of one of the spacing members;

FIG. 7 is a plan view of two adjacent spacing members;

FIG. 8 is a fragmentary side elevational view of another embodiment of apparatus in accordance with the present invention;

FIGS. 9 and 10 are plan views of the rolling element spacing members in the stacked and fully open positions respectively;

FIG. 11 is a perspective view showing the details of construction of one of the rolling element spacing members; and FIG. 12 is a plan view of adjacent rolling spacing members of the apparatus of FIG. 8 in a partially open position.

Figure 3:
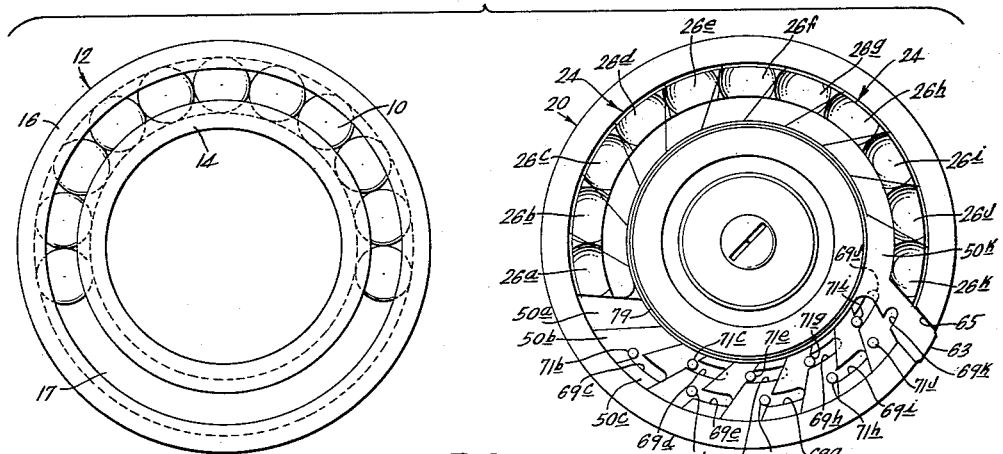
FIGS. 3, 4 and 5 are plan views showing the relative positions of the rolling elements of a bearing assembly and the rolling element spacing members in the closed, partially open and fully open positions respectively of the spacing members.

With reference to the drawings, there is shown in FIGS. 1 and 2 apparatus in accordance with the present invention for orienting or spacing the rolling elements of a rolling bearing in the present instance of the balls 10 of a ball bearing assembly 12 including the usual inner and outer race rings 14 and 16 respectively which are spaced apart to provide an annular space 17 for the balls 10. With reference to the primary component elements of the apparatus and their respective functions, there is provided a generally cylindrical hollow housing 20 and a plurality of ball spacing members 22 which are mounted in the housing 20 and which in the present instance correspond in number to the number of balls 10 of the bearing assembly. Each of the spacing members 22 includes a finger 24 having a spherical cup-like roller engaging seat 26 in one axial end face thereof, the seats 26 for all of the spacing members confronting the open end of the housing 20 and being disposed in a common plane P extending transversely of the axis of the housing 20.

Figure 4:
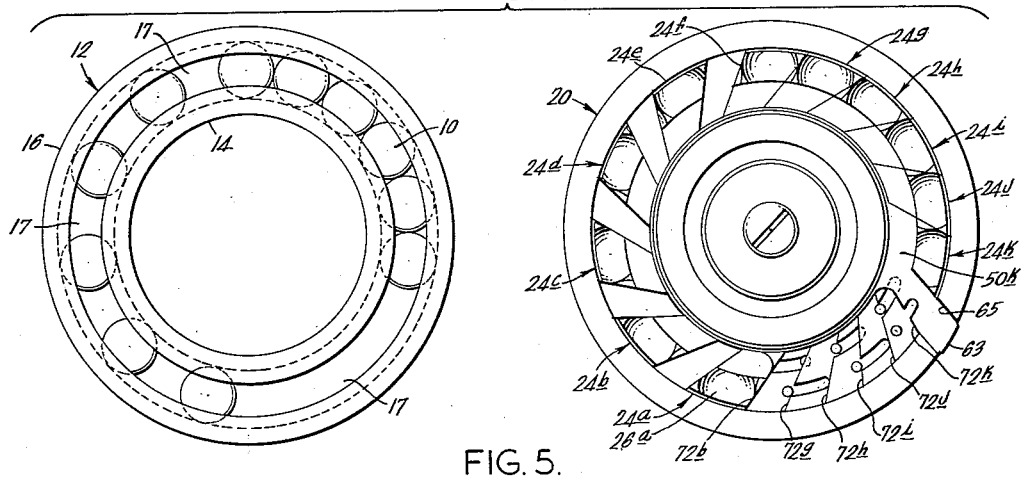

The fingers 24 are actuatable between a stacked or a closed position in close side by side relation as shown in FIG. 4 and an open position wherein all of the fingers are arranged in a circular array and equispaced relative to one another as shown in FIG. 6. The spacing members 22 additionally are mounted for relative axial movement with respect to the housing between a retracted position shown in FIG. 1 and an extended position wherein each of the seats 26 is cooperatively disposed relative to one of the balls [see FIG. 2].

Accordingly in the operation of the spacing apparatus, assume that the spacing members 22 are in the retracted position and the fingers 24 are stacked or closed [see FIG. 3]. The bearing assembly 12 is placed over the open end of the housing 20 so that the balls 10 which are gathered in a group in a segment of the annular space 17 are confronting the seats 26 of the spacing members 22. Thereafter, the spacing members 22 and housing are moved axially relative to one another so that each of the balls 10 is nested in one of the seats 26 [see FIG. 2]. The fingers 24 are then rotated in the housing whereby the fingers tend to fan out and space themselves relative to one another so that the seats 26 and balls 10 are equispaced in the fully open position shown in FIG. 5. During rotation of the spacing members, the seats 26 carry the balls 10 with them to space the balls uniformly relative to one another as shown in the left hand side of FIG. 5. Thereafter, a cage is dropped into position and spacing members 22 are retracted into the housing.

Even though the apparatus of the present invention is shown and described with reference to a ball bearing assembly, it is of course to be understood that it may be used on other types of bearing assemblies.

Considering now more specifically some of the above components of the spacing apparatus, there is provided a hollow cylindrical sleeve 30 coaxial with the housing 20 and of smaller cross section than the housing 20 having a radially extending flange 32 which at its outer peripheral edge is connected to the lower end of the housing 20 by suitable fasteners. Mounted within the sleeve 30 is an elongated generally cylindrical hollow casing 34 which mounts at its lower end a collar 36 for securing the apparatus on a suitable support, such as the table 38 of an arbor press. An elongated rod 40 is rotatably supported in the casing 34 and supports at its upper end the ball spacing members 22. The ball spacing members are normally urged to a retracted position [FIG. 1] nested in the housing 20 by a spring biasing arrangement which as illustrated, comprises a pair of posts 42 which engage through openings in the flange 32 and are secured to a radial extension 44 at the upper end of the casing 34 and a coil spring 48 circumscribing each of the posts 42 having one end engaging in a cup-like recess in the outer face of the flange 32 and the opposite end abutting a head 49 on the post 42. By this arrangement, the ball spacing members 22 may be actuated to an extended position wherein the tips of the fingers 24 project beyond the open end of the housing 20 by moving the housing 20 axially downwardly against the biasing force of the springs 48. Downward movement of the housing 20 is limited by engagement of the lower axial end face of the sleeve 30 against the collar 36. In this position, as illustrated in FIG. 2, the balls 10 are nested in the seats 26 of the fingers 24 and are slightly spaced therefrom to prevent jamming of the balls which might cause damage thereto during the spacing operation.

Considering now more specifically the ball spacing members, the number of spacing members corresponds in number to the number of balls 10, in the present instance eleven spacing members, $22^a$–$22^k$ inclusive. The driver spacing member $22^a$ comprises a generally circular disk or plate $50^a$ having a central opening $51^a$ to fit over the rod 40 and the finger $24^a$ is mounted adjacent the peripheral edge of the disk $50^a$ extending axially thereof as shown in FIG. 1. As illustrated, the disk $50^a$ for the lead or driver spacing member is supported on a thrust bearing assembly 52 housed in a cup-like recess 54 in the upper axial end of the casing 34 and has a depending radial flange at its hub portion where it is secured to the rod 40 whereby angular rotation of the rod 40 effects rotation of the disk $50^a$ and finger $24^a$ in the housing 20.

The remaining spacing members $24^b$–$24^k$ are generally of the construction of one of the intermediate spacing members $22^g$ and it is noted that similar parts of various members are identified by the same number and a different letter. The spacing member $24^g$ shown in FIG. 6, includes a generally circular disk or plate $50^g$ having a central opening $51^g$ and a cutaway peripheral edge defining circumferentially spaced, generally radially extending abutment shoulders $70^g$ and $72^g$, the finger $24^g$ being mounted on one face of the disk $50^g$ so that a side edge of the finger is aligned with the shoulder $70^g$.

As illustrated in FIG. 1, the disks $50^a$–$50^k$ are stacked on top of one another in face to face relation, the fingers the members $50^a$–$50^k$ being progressively shorter by the thickness of the disks so that the tips of all of the fingers lie in a common plane P perpendicular to the axis of the housing 20. Further the circumferential distance D between the shoulders 70 and 72 increases progressively for the members $24^b$–$24^k$ respectively by an amount equal to the desired spacing between the fingers 24 in the open or fanned out position so that in the closed position the shoulders 72 are staggered as shown in FIG. 2 and whereby the finger $24^a$ of the lead or driver spacing member $22^a$ successively engages the shoulders $72^b$–$72^k$ during the spacing operation to fan out the fingers [see FIGS. 4 and 5]. The uppermost spacing member $22^k$ includes a radial lug 63, one radial face of which defines the shoulder $72^k$ and which engages in a slot 65 in the side wall of the housing 20 to prevent angular movement of spacing member $22^k$ relative to the housing. Further the disk $50^k$ has a depending hollow cylindrical hub portion 67 which circumscribes the rod 40, the lower end of which is spaced slightly from the upper face of the disk $50^a$. Suitable fastener means is provided at the upper end of the rod 40 to detachably retain the spacing members on the rod 40 and to exert a slight axial pressure on the stack to permit relative angular movement of the disks.

Means is provided for limiting relative angular movement of the disks during movement of the spacing members from a stacked or closed to an open position so that the seats 26 are equispaced in the open position. To this end as illustrated in FIG. 7, each of the disks $50^c$–$50^k$ inclusive is provided with a generally U-shaped slot 69 extending inwardly circumferentially from the shoulder 72. Each of the disks $50^b$–$50^k$ inclusive mounts an axially extending pin 71 which engages in the slot 69 of the adjacent higher plate to limit relative angular movement of the plates in the open position. For example with respect to FIG. 7, upon a predetermined angular movement of the disks $50^f$ and $50^g$ relative to one another, the pin $71^f$ bottoms in the slot $69^g$ whereby the seats $26^g$ and $26^f$ are spaced apart circumferentially the desired angular distance.

Figure 5:
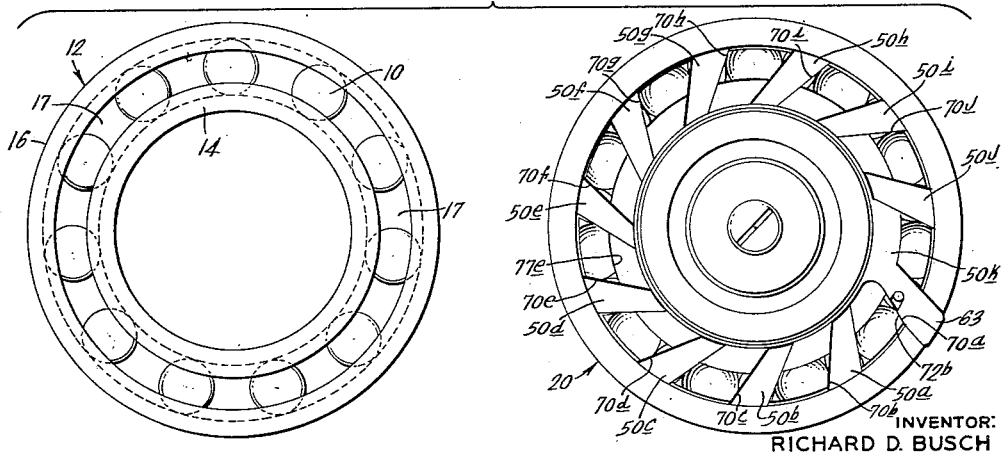

In assembling the bearing assembly 12, the balls 10 are placed in the annular space 17 between the inner and outer race rings 14 and 16 respectively in a conventional manner. The balls 10 are then gathered so that they lie in close contacting relation in one segment of the annular space 17 between the race rings as shown in FIG. 4. The bearing assembly is then placed over the open end of the housing 20 of the spacing apparatus with one axial end face of the outer race ring 16 confronting and engaging the axial end face of the housing 20 as shown in FIG. 1. The ball spacing members $22^a$–$22^k$ are in the stacked, retracted position shown in the right-hand side of FIG. 4, the bearing assembly being located on the housing so that each of the balls 12 is aligned with and overlies one of the seats 26 of the fingers 24. The ball spacing members $22^a$–$22^k$ are then actuated to an extended position closely adjacent the balls 10 of the bearing assembly and this is accomplished, in the present instance, by lowering the ram R of the arbor press to engage the bearing assembly and move it downwardly until the sleeve 30 abuts the collar 36, the position shown in FIG. 2. It is noted that the tips of the fingers 24 are cut away as at 77 to provide a space between the fingers 24 and a bushing 79 carried by the uppermost disk $50^k$ for reception of the inner race ring 14. The bushing 79 which is preferably of a resilient material serves to locate the inner race ring and prevent displacement thereof. It is noted that in this position, each of the balls 10 is nested in the seats 26 of the fingers 24 and is slightly spaced from the spherical surface thereof to preclude jamming of the balls and damage to the elements of the bearing assembly. The handle 40a on the rod is then turned in a counterclockwise direction with respect to FIG. 4 whereby the disk $50^a$ of the driver spacing member is also rotated in a counterclockwise direction. As the disk $50^a$ is rotated, the finger $24^a$ initially abuts the shoulder $72^b$ of the next adjacent higher disk in the stack thereby spacing the fingers $24^a$ and $24^b$ whereby the balls 10 carried thereby are displaced a predetermined angular distance relative to one another. During further rotation of the rod, the lead or drive finger $24^a$ successively engages the shoulder 72 for the remaining disks thereby to space the fingers and the rolling elements carried thereby as illustrated in FIG. 5. It is noted that even though the lead fingers of the group of spacing members are illustrated as being equispaced apart during the spacing operation, it is possible that they are not equispaced due to the frictional interengagement between the disks. However, in the fully open position [FIG. 5], the fingers and balls are equispaced, the pins for the various disks cooperating and engaging in the U-shaped slots to positively limit angular displacement of adjacent disk members relative to one another. When the lead finger $26^a$ has been rotated to the position shown in FIG. 6, it abuts the side face of the lug on the uppermost disk member $50^k$ whereby all of the fingers 24 and balls 12 carried thereby are equispaced. It is noted that the lug 63 is of a predetermined width to space the seats $26^a$ and $26^k$ the desired distance apart in the open position of the fingers. Thereafter, with the balls 10 equispaced, the ram is moved upwardly whereby the coil springs 48 return the housing 20 to its normal position shown in FIG. 1 wherein the spacing members 22 are nested in the housing. The bearing assembly is now ready for application of a cage or separator. The rod 40 may be rotated in a clockwise direction whereby the ball spacing members 22 are returned to the stacked or closed position shown in FIG. 4.

Another embodiment of spacing apparatus in accordance with the present invention is shown in FIGS. 8–12 inclusive. This apparatus is similar in overall arrangement and operation to that described above, except that the ball spacing members and the means for limiting relative angular movement of the spacing fingers to insure equi- spacing thereof in the fully open position differ from that described above. Thus, the apparatus includes a generally cylindrical hollow housing 120, an elongated sleeve 130 having a radially extending flange 132 at its upper end connected at its outer peripheral edge to the lower portion of the housing 120, an elongated cylindrical casing 134 mounted interiorly of the sleeve 130 which at its lower end mounts a collar [not shown] for securing the apparatus to the table of an arbor press or the like. Spring biasing means including a post 142 and a coil spring 148 arrangement similar to that described above, is provided to normally maintain the ball spacing members $122^a$–$122^k$ carried at the upper end of a rod 140 nested in the housing 120. The lowermost spacing member $122^a$ which is the lead or driver member includes a generally circular disk or plate $150^a$ keyed to the rod 140 for rotation thereby and an elongated finger $124^a$ which projects axially from one face of the disk $150^a$ adjacent the periphery thereof and which has a spherical seat or pocket $126^a$ in the axial end face remote from the disk.

The ball spacing member $122^g$ shown in FIG. 11 is typical of the members $122^b$–$122^k$ inclusive and as illustrated, comprises a generally circular disk or plate $150^g$ having a portion of its peripheral edge cut away to define a circumferentially spaced apart generally radially extending shoulders $170^g$ and $172^g$, the finger $124^g$ being disposed adjacent the shoulder $170^g$ and having a face thereof aligned with the shoulder $170^g$. In the assembled relation, the fingers 124 for the members $122^b$–$122^k$ are successively shorter than the longest drive finger $124^a$ so that the seats 126 for all of the fingers lie in a common plane P' transverse to the axis of the housing 120 and the circumferential distance D' between the shoulders 170 and 172 increases progressively for the disks $150^a$–$150^k$ by an amount equal to the desired spacing of the fingers in the open position.

In the present instance, means is provided for limiting angular movement of the ball spacing members to insure equispacing of the fingers 124 and seats 126 in the fully open position. To this end an axially extending rib 177 is mounted on the inner wall of the housing 120 which as illustrated in FIG. 8, projects radially inwardly of the inner peripheral surface of the housing 120. The rib 177 cooperates with circumferentially spaced apart abutments 173 and 175 formed by an undercut in the periphery in each of the disks as shown in FIGS. 11 and 12. The abutments 173 for each of the disks $150^b$–$150^k$ inclusive is disposed adjacent the shoulder 172, the circumferential distance S between the abutments 173 and 175 increases progressively for the disks $150^b$–$150^k$ by an amount equal to desired spacing between the fingers of the spacing members in the open position. Thus during the spacing operation and with respect to FIG. 12, when the disk $150^g$ has been turned in a counterclockwise direction, to a position where the abutment $173^g$ engages the rib 177 and when the next lower disk $150^f$ has been turned so that its abutment $173^f$ also engages the rib 177, the fingers $126^f$ and $126^g$ are spaced apart the desired distance $D_s$ and the disks are restrained against further relative rotation.

The operation of the spacing apparatus is similar to that described above. For example, with the ball spacing members in a retracted position, a bearing assembly 112 with the balls 110 arranged in contacting side by side relation in one segment of the annular space 117 between the inner and outer race rings 114 and 116 is then positioned at the open end of the housing 120 with the balls aligned with the stacked seats 126 of the ball spacing members. The ram R' of the arbor is then moved downwardly to displace the housing 120 whereby the balls nest in the seats or pockets 126 of the spacing members as shown in FIG. 8. Thereafter the rod 140 is rotated in a counterclockwise direction with respect to FIG. 9 whereby the lead finger $124^a$ engages the abutment shoulder 172 of each of the disks 150 successively to space the fingers and balls in a predetermined spaced apart relation relative to one another. It is noted that as the disks of the various spacing members are rotated in a counterclockwise direction, the abutment 173 engages the rib member 177 thereby to insure predetermined uniform spacing of all of the fingers and balls in the open position illustrated in FIG. 10. Thereafter a cage or the like may be applied to the assembly and the assembly removed from the open end of the housing. The spacing members are then rotated to the stacked position to prepare the apparatus for the next bearing assembly.

While particular embodiments of the present invention have been illustrated and described herein, it is not intended to limit the invention and changes and modifications may be made therein within the scope of the following claims.

I claim:

1. Apparatus for orienting the rolling elements of a bearing assembly including inner and outer race rings spaced apart to provide an annular space for the rolling elements, comprising a plurality of spacing members having portions adapted to engage the rolling elements, means mounting the spacing members for movement relative to one another to position the rolling elements at predetermined locations in the annular space.

2. Apparatus for orienting the rolling elements of a bearing assembly including inner and outer race rings spaced apart to provide an annular space for the rolling elements, comprising a plurality of spacing members each having a portion adapted to engage one of the rolling elements and means mounting the spacing members for movement relative to one another to position the rolling elements at predetermined locations in the annular space.

3. Apparatus for orienting the rolling elements of a bearing assembly including inner and outer race rings spaced apart to provide an annular space for the rolling elements, comprising a plurality of spacing members each having a portion adapted to engage one of the rolling elements and means mounting the spacing members for movement relative to one another to position the rolling elements at equispaced apart locations in the annular space.

4. Apparatus for orienting the rolling elements of a bearing assembly including inner and outer race rings spaced apart to provide an annular space for the rolling elements, comprising a plurality of spacing members having portions adapted to engage the rolling elements, means mounting the spacing members for movement relative to one another to position the rolling elements at predetermined locations in the annular space and means limiting relative movement of said spacing members to insure that the rolling elements are disposed at said predetermined locations.

5. Apparatus for orienting the rolling elements of a bearing assembly including inner and outer race rings spaced apart to provide an annular space for the rolling elements, comprising a plurality of spacing members having portions adapted to engage the rolling elements and means mounting said spacing members for relative movement between a closed position wherein the rolling element engaging portions are disposed in a predetermined arcuate segment of a circular path and an open position wherein the rolling element engaging portions are disposed at predetermined spaced apart locations along said path.

6. Apparatus for orienting the rolling elements of a bearing assembly including inner and outer race rings spaced apart to provide an annular space for the rolling elements, comprising a plurality of spacing members at least corresponding in number to the number of rolling elements and each having a portion adapted to engage one of the rolling elements and means for mounting the spacing members for movement relative to one another to equispace the rolling elements in the annular space.

7. Apparatus for orienting the rolling elements of a bearing assembly including inner and outer race rings spaced apart to provide an annular space for the rolling elements, comprising a plurality of spacing members at least corresponding in number to the number of rolling elements and each member having a rolling element engaging portion, means mounting said spacing members for relative movement between a closed position wherein said rolling element engaging portions are in close side by side relation in a predetermined segment of a circular path and an open position wherein the rolling element engaging portions of said members are spaced apart circumferentially at predetermined locations along said circular path.

8. Apparatus for orienting the rolling elements of a bearing assembly including inner and outer race rings spaced apart to provide an annular space for the rolling elements, comprising a plurality of spacing members at least corresponding in number to the number of rolling elements and each member having a rolling element engaging portion, means mounting said spacing members for relative movement between a closed position wherein said rolling element engaging portions are in close side by side relation in a predetermined segment of a circular path and an open position wherein the rolling element engaging portions of said members are spaced apart circumferentially at predetermined locations along said circular path and means limiting movement of said members relative to one another to insure that the rolling element engaging portions of said members are disposed at said predetermined locations in the open position.

9. Apparatus for orienting the rolling elements of a bearing assembly including inner and outer race rings spaced apart to provide an annular space for the rolling elements, comprising a plurality of spacing members at least corresponding in number to the number of rolling elements and each member having a rolling element engaging portion, means disposing said spacing members in a closed position wherein said rolling element engaging portions are in close side by side relation in a predetermined arcuate segment of a circular path and an open position wherein the rolling element engaging portions of said spacing members are equispaced circumferentially along said circular path and means limiting movement of said rolling members relative to one another to insure that the rolling element engaging portions of said members are all equispaced in the open position.

10. Apparatus for orienting the rolling elements of a bearing assembly including inner and outer race rings spaced apart to provide an annular space for the rolling elements, comprising an elongated hollow housing open at least at one end, a plurality of spacing members mounted in said houisng having rolling element engaging portions disposed in a common plane transverse to the longitudinal axis of the housing, means for effecting relative movement of said housing and spacing members between a retracted position wherein the rolling element engaging portions are nested in said housing and an extended position wherein the rolling element engaging portions project beyond the open end of the housing and cooperatively engage with the rolling elements of a bearing assembly positioned over the open end of said housing and means mounting said spacing members for relative movement to position the rolling elements at predetermined locations in the annular space.

11. Apparatus as claimed in claim 10 including spring biasing means normally maintaining spacing members in said retracted position.

12. Apparatus as claimed in claim 10 wherein each of said rolling element spacing members comprises a generally circular disk, an axially extending finger mounted adjacent the peripheral edge of said disk and a generally spherical seat in the free axial end face of said finger defining the rolling element engaging portion and wherein said disks are mounted in face to face relation to form a stack, the fingers of the respective disks being progressively shorter from one end of the stack to the other so that the seats of all of the fingers are disposed in said predetermined common plane.

13. Apparatus as claimed in claim 12 wherein the disk of one of the spacing members at one end of the stack is fixed against angular movement relative to the housing and the remaining disks are mounted for predetermined angular movement relative to the housing during the spacing operation.

14. Apparatus as claimed in claim 12 including means limiting movement of the spacing members relative to one another comprising means defining a slot in some of said disks and a pin carried by some said disks which cooperates and engages n the slots to limit angular movement of adjacent disks relative to one another.

15. Apparatus for orienting the rolling elements of a bearing assembly including inner and outer race rings spaced apart to provide an annular space for the rolling elements, comprising an elongated hollow housing open at least at one end, a plurality of spacing members mounted in said housing having rolling element engaging portions disposed in a common plane transverse to the longitudinal axis of the housing, means for effecting relative movement of said housing and spacing members between a retracted position wherein the rolling element engaging portions are nested in said housing and an extended position wherein the rolling element engaging portions project beyond the open end of the housing and cooperatively engage with the rolling elements of a bearing assembly positioned over the open end of said housing and means mounting said spacing members for relative movement between a closed position wherein said rolling element engaging portions are disposed in a predetermined arcuate segment of a circular path and an open posittion wherein the rolling element engaging portions are disposed at predetermined spaced apart locations along said circular path.

16. Apparatus for orienting the rolling elements of a bearing assembly including inner and outer race rings spaced apart to provide an annular space for the rolling elements, comprising an elongated hollow housing open at least at one end, a plurality of spacing members mounted in said housing having rolling element engaging portions disposed in a common plane transverse to the longitudinal axis of the housing, means for effecting relative movement of said housing and spacing members between a retracted position wherein the rolling element engaging portions are nested in said housing and an extended position wherein the rolling element engaging portions project beyond the open end of the housing and cooperatively engage with the roling elements of a bearing assembly positioned over the open end of said housing and means mounting said spacing members for relative movement between a closed position wherein said rolling element engaging portions are disposed in a predetermined arcuate segment of a circular path and an open position wherein the rolling element engaging portions are disposed at predetermined spaced apart locations along said circular path and means limiting movement of said spacing members relative to one another to insure that the rolling elements are disposed at said predetermined locations in the open position.

17. Apparatus for orienting the rolling elements of a bearing assembly including inner and outer race rings spaced apart to provide an annular space for the rolling elements, comprising a generally cylindrical hollow housing open at least at one end, a plurality of rolling element spacing members mounted in said housing, each of said members including a disk and a rolling element engaging portion and all of said disks mounted in face to face relation in a stack, means mounting said disks for relative movement whereby said rolling element engaging portions may be moved to an open position spaced apart circumferentially at predetermined locations along a circular path, an elongated rib projecting radially inwardly from the inner peripheral surface of the housing and extending axially thereof, some of said disks having a cut away peripheral edge portion defining circumferentially spaced abutments which cooperate with said rib to limit angular movement of each of the disks relative to the housing, said abutment portions being spaced apart circumferentially a progressively greater distance from one end of the stack to the other whereby the rolling element engaging portions of said spacing members are equispaced apart in the open position.

18. Apparatus as claimed in claim 17 including means for effecting relative movement of said housing and said spacing members between a retracted position wherein the rolling element spacing members are nested in said housing and an extending position wherein the rolling element engaging portions of said rolling element spacing members project beyond the open end of the housing and cooperatively engage with the rolling elements of the bearing assembly positioned over the open end of said housing and spring biasing means normally maintaining said rolling element spacing members in said retracted position.

19. A method for orienting the rolling elements of a bearing assembly including inner and outer race rings spaced apart to provide an annular space for the rolling elements, consisting of the steps of gathering all of the rolling elements in a predetermined arcuate segment of the annular space, individually engaging all of the rolling elements simultaneously and individually moving each of the rolling elements to a predetermined spaced apart location in said annular space.

20. A method for orienting the rolling elements of a bearing assembly including inner and outer race rings spaced apart to provide an annular space for the rolling elements, consisting of the steps of gathering the rolling elements in close side by side relation in a predetermined arcuate segment of the annular space, individually engaging all of the rolling elements simultaneously and individually moving the rolling elements angularly in the annular space to a position where all of the rolling elements are equispaced apart circumferentially in the annular space.

References Cited in the file of this patent

UNITED STATES PATENTS 2,931,095    Esken ------------------ Apr. 5, 1960